United States Patent
Boon et al.

(10) Patent No.: US 7,751,959 B2
(45) Date of Patent: Jul. 6, 2010

(54) SEMI-ACTIVE SUSPENSION SYSTEM WITH ANTI-ROLL FOR A VEHICLE

(75) Inventors: Peter Boon, Merchtem (BE); Koen Reybrouck, Etterbeek (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 11/471,311

(22) Filed: Jun. 20, 2006

(65) Prior Publication Data

US 2006/0287791 A1     Dec. 21, 2006

Related U.S. Application Data

(60) Provisional application No. 60/692,433, filed on Jun. 21, 2005.

(51) Int. Cl.
  *B60G 17/016* (2006.01)
(52) U.S. Cl. .............................. 701/38; 701/37; 701/48; 701/91; 267/64.11; 267/64.13; 267/64.15; 267/64.16; 267/218; 267/274; 280/5.5; 280/5.504; 280/5.505; 280/5.507; 280/5.514; 280/5.512; 280/5.515; 280/6.159; 280/124.1; 280/124.106; 280/124.157; 280/124.161; 248/562; 137/613; 137/614; 137/614.19; 137/614.2; 91/446; 91/449; 91/453; 251/14; 251/15; 251/30.01; 251/62; 251/68; 251/73; 251/74
(58) Field of Classification Search ............... 701/37, 701/38, 48, 91; 267/64.11, 64.13, 64.15, 267/64.16, 218, 274; 280/5.5, 5.504, 5.505, 280/5.507, 5.514, 5.512, 5.515, 6.159, 124.1, 280/124.106, 124.157, 124.161; 248/562; 137/613, 614, 614.19, 614.2; 91/446, 449, 91/453; 251/14, 15, 30.01, 62, 68, 73, 74
See application file for complete search history.

(56) References Cited

U.S. PATENT DOCUMENTS

| | | | | |
|---|---|---|---|---|
| 3,895,816 A | * | 7/1975 | Takahashi et al. | 280/5.503 |
| 3,941,403 A | * | 3/1976 | Hiruma | 280/6.157 |
| 4,277,076 A | * | 7/1981 | Hanna | 280/5.508 |
| 4,293,139 A | * | 10/1981 | Brown | 280/6.159 |
| 4,335,901 A | * | 6/1982 | Gladish | 280/6.151 |
| 4,390,188 A | * | 6/1983 | Rouse | 280/6.159 |
| 4,397,477 A | * | 8/1983 | Harrison | 280/6.157 |
| 4,404,892 A | * | 9/1983 | Nakamura et al. | 91/396 |
| 4,469,315 A | * | 9/1984 | Nicholls et al. | 267/64.17 |
| 4,566,718 A | * | 1/1986 | Kanai et al. | 180/423 |
| 4,573,705 A | * | 3/1986 | Kanai et al. | 180/422 |
| 4,595,072 A | * | 6/1986 | Barnea | 180/169 |

(Continued)

FOREIGN PATENT DOCUMENTS

| | | |
|---|---|---|
| EP | 1 238834 A2 | 2/2002 |
| GB | 2243349 A | 4/1991 |
| GB | 2337730 A | 3/1998 |
| TW | 504473 A | 10/2002 |
| WO | WO 95/23076 | 2/1995 |

OTHER PUBLICATIONS

UK Search Report.
Office Action dated Feb. 13, 2009 is corresponding Chinese Patent Application No. 200610086446.6 with English translation.

*Primary Examiner*—Khoi Tran
*Assistant Examiner*—Jorge O Peche
(74) *Attorney, Agent, or Firm*—Harness, Dickey & Pierce, PLC

(57) ABSTRACT

A suspension system includes four electronically controlled actuators, one at each of the four wheels. The actuators are each controlled by an electronic control unit. The left front and right front actuators are mechanically connected with each other. The left rear and the right rear actuators are also mechanically connected with each other. The only connection between the front two actuators and the rear two actuators is an electronic communication through the electronic control unit.

10 Claims, 2 Drawing Sheets

U.S. PATENT DOCUMENTS

Figure 1:
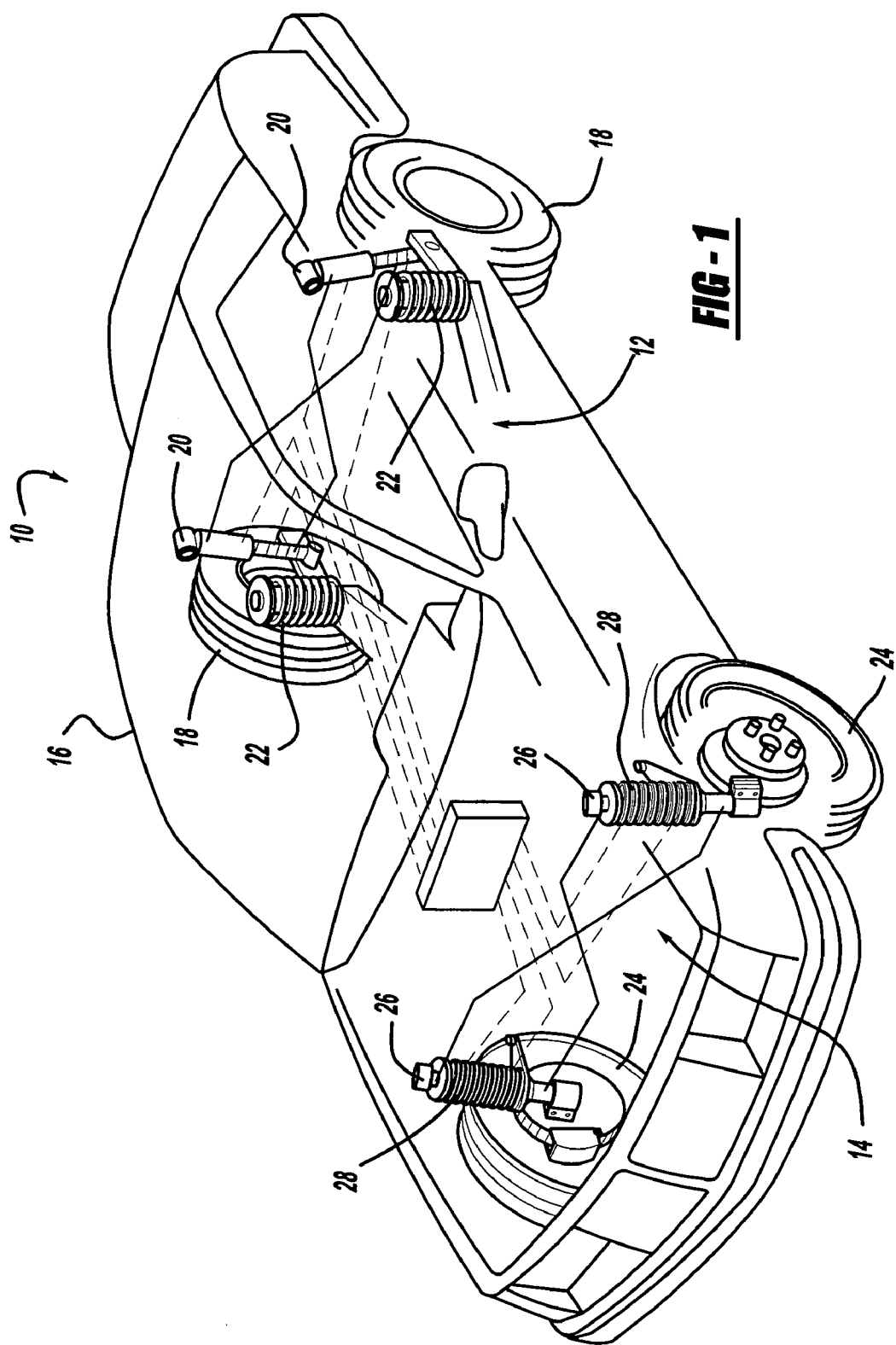

| | | | | |
|---|---|---|---|---|
| 4,621,833 A * | 11/1986 | Soltis | | 280/5.51 |
| 4,625,993 A * | 12/1986 | Williams et al. | | 280/5.507 |
| 4,722,545 A * | 2/1988 | Gretz et al. | | 280/771 |
| 4,743,046 A * | 5/1988 | Schnittger | | 280/5.519 |
| 4,761,022 A * | 8/1988 | Ohashi et al. | | 280/5.504 |
| 4,828,229 A * | 5/1989 | Fannin et al. | | 267/64.25 |
| 4,848,791 A * | 7/1989 | Bridges | | 280/93.501 |
| 4,867,466 A * | 9/1989 | Soltis | | 280/93.501 |
| 4,999,776 A * | 3/1991 | Soltis et al. | | 701/41 |
| 5,020,826 A * | 6/1991 | Stecklein et al. | | 280/124.159 |
| 5,097,419 A * | 3/1992 | Lizell | | 701/37 |
| 5,098,119 A * | 3/1992 | Williams et al. | | 280/5.507 |
| 5,130,926 A * | 7/1992 | Watanabe et al. | | 701/37 |
| 5,188,390 A * | 2/1993 | Clark | | 280/5.501 |
| 5,218,546 A * | 6/1993 | Bradshaw et al. | | 701/37 |
| 5,230,529 A * | 7/1993 | Harvey-Bailey | | 280/5.508 |
| 5,231,583 A * | 7/1993 | Lizell | | 701/37 |
| 5,258,913 A * | 11/1993 | Baldauf | | 701/37 |
| 5,265,704 A * | 11/1993 | Landesfeind | | 188/378 |
| 5,265,913 A * | 11/1993 | Scheffel | | 280/6.158 |
| 5,338,010 A * | 8/1994 | Haupt | | 267/64.16 |
| 5,351,790 A * | 10/1994 | Machida | | 188/314 |
| 5,434,782 A * | 7/1995 | Henry | | 701/37 |
| 5,483,448 A * | 1/1996 | Liubakka et al. | | 701/37 |
| 5,490,068 A * | 2/1996 | Shimizu et al. | | 701/38 |
| 5,510,985 A * | 4/1996 | Yamaoka et al. | | 701/37 |
| 5,517,847 A * | 5/1996 | Campbell et al. | | 73/11.07 |
| 5,521,821 A * | 5/1996 | Shimizu et al. | | 701/37 |
| 5,539,639 A * | 7/1996 | Devaud et al. | | 701/37 |
| 5,556,115 A * | 9/1996 | Heyring | | 280/6.158 |
| 5,559,700 A * | 9/1996 | Majeed et al. | | 701/36 |
| 5,563,789 A * | 10/1996 | Otterbein et al. | | 701/38 |
| 5,570,288 A * | 10/1996 | Badenoch et al. | | 701/37 |
| 5,572,425 A * | 11/1996 | Levitt et al. | | 701/37 |
| 5,584,498 A * | 12/1996 | Danek | | 280/5.503 |
| 5,601,306 A * | 2/1997 | Heyring | | 280/5.508 |
| 5,606,503 A * | 2/1997 | Shal et al. | | 701/1 |
| 5,682,968 A * | 11/1997 | Boichot et al. | | 188/266.2 |
| 5,682,980 A * | 11/1997 | Reybrouck | | 280/5.504 |
| 5,692,587 A * | 12/1997 | Fratini, Jr. | | 188/266.2 |
| 5,706,196 A * | 1/1998 | Romstadt | | 701/37 |
| 5,721,681 A * | 2/1998 | Borschert et al. | | 701/37 |
| 5,725,239 A * | 3/1998 | de Molina | | 280/5.503 |
| 5,794,966 A * | 8/1998 | MacLeod | | 280/5.507 |
| 5,808,890 A * | 9/1998 | Sasaki | | 701/37 |
| 5,882,017 A * | 3/1999 | Carleer | | 280/5.508 |
| 5,897,130 A * | 4/1999 | Majeed et al. | | 280/5.507 |
| 6,076,837 A * | 6/2000 | Kokotovic | | 280/5.504 |
| 6,129,368 A * | 10/2000 | Ishikawa | | 280/124.112 |
| 6,220,406 B1 * | 4/2001 | de Molina et al. | | 188/275 |
| 6,244,398 B1 * | 6/2001 | Girvin et al. | | 188/316 |
| 6,259,982 B1 * | 7/2001 | Williams et al. | | 701/38 |
| 6,264,212 B1 * | 7/2001 | Timoney | | 280/5.51 |
| 6,279,854 B1 * | 8/2001 | Lindahl | | 244/104 FP |
| 6,283,483 B1 * | 9/2001 | Johnson et al. | | 280/86.758 |
| 6,298,292 B1 * | 10/2001 | Shono et al. | | 701/37 |
| 6,502,837 B1 * | 1/2003 | Hamilton et al. | | 280/5.515 |
| 6,598,885 B2 * | 7/2003 | Delorenzis et al. | | 280/5.507 |
| 6,679,504 B2 * | 1/2004 | Delorenzis et al. | | 280/5.507 |
| 6,789,017 B2 * | 9/2004 | Aanen et al. | | 701/41 |
| 6,811,167 B2 * | 11/2004 | Coombs et al. | | 280/124.154 |
| 6,814,364 B2 * | 11/2004 | Coombs et al. | | 280/124.154 |
| 6,816,799 B2 * | 11/2004 | Yu et al. | | 702/94 |
| 6,871,866 B2 * | 3/2005 | Gloceri et al. | | 280/124.154 |
| 6,886,837 B2 * | 5/2005 | Gibbs | | 280/43.17 |
| 6,886,841 B2 * | 5/2005 | Coombs et al. | | 280/124.157 |
| 6,932,367 B2 * | 8/2005 | Radamis | | 280/124.158 |
| 7,055,831 B2 * | 6/2006 | Brandenburger | | 280/5.504 |
| 7,055,832 B2 * | 6/2006 | Germain | | 280/5.508 |
| 7,076,351 B2 * | 7/2006 | Hamilton et al. | | 701/37 |
| 7,360,777 B2 * | 4/2008 | Mizuno et al. | | 280/124.157 |
| 7,413,063 B1 * | 8/2008 | Davis | | 188/267.1 |
| 7,637,516 B2 * | 12/2009 | Mizuno et al. | | 280/124.157 |
| 7,641,181 B2 * | 1/2010 | Delorenzis | | 267/64.13 |
| 2004/0094929 A1 * | 5/2004 | Ribi | | 280/124.161 |
| 2004/0113377 A1 * | 6/2004 | Klees | | 280/5.514 |
| 2005/0240326 A1 * | 10/2005 | Lauwerys et al. | | 701/38 |
| 2006/0151964 A1 * | 7/2006 | Kasamatsu | | 280/5.51 |
| 2007/0045067 A1 * | 3/2007 | Schedgick et al. | | 188/266 |

* cited by examiner

SEMI-ACTIVE SUSPENSION SYSTEM WITH ANTI-ROLL FOR A VEHICLE

CROSS-REFERENCE TO RELATED APPLICATIONS

This application claims the benefit of U.S. Provisional Application No. 60/692,433, filed on Jun. 21, 2005. The disclosure of the above application is incorporated herein by reference.

FIELD

The present invention relates to suspension systems for vehicles of the like. More particularly, the present invention relates to a semi-active anti-roll system that controls the roll of the vehicle during maneuvering such as when rounding a corner.

BACKGROUND

The statements in this section merely provide background information related to the present disclosure and may not constitute prior art.

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel which are located between the sprung portion and the unsprung portion of the vehicle.

Hydraulic actuators, such as shock absorbers and/or struts, are used in conjunction with conventional passive suspension systems to absorb unwanted vibration which occurs during driving. To absorb this unwanted vibration, hydraulic actuators include a piston located within a pressure cylinder of the hydraulic actuator. The piston is connected to the sprung portion or body of the vehicle through a piston rod. Because the piston is able to restrict the flow of damping fluid within the working chamber of the hydraulic actuator when the piston is displaced within the pressure cylinder, the hydraulic actuator is able to produce a damping force which counteracts the vibration of the suspension. The greater the degree to which the damping fluid within the working chamber is restricted by the piston, the greater the damping forces which are generated by the hydraulic actuator.

In recent years, substantial interest has grown in automotive vehicle suspension systems which can offer improved comfort and road handling over the conventional passive suspension systems. In general, such improvements are achieved by utilization of an "intelligent" suspension system capable of electronically controlling the suspension forces generated by hydraulic actuators.

Different levels in achieving the ideal "intelligent" suspension system called a semi-active or a fully active suspension system are possible. Some systems control and generate damping forces based upon the dynamic forces acting against the movement of the piston. Other systems control and generate damping forces based on the static or slowly changing dynamic forces, acting on the piston independent of the velocity of the piston in the pressure tube. Other, more elaborate systems, can generate variable damping forces during rebound and compression movements of the hydraulic actuator regardless of the position and movement of the piston in the pressure tube.

In addition to controlling the damping forces generated in the hydraulic actuators using a semi-active or fully active suspension system, it would be advantageous to add an anti-roll function to the suspension system by inter-connecting the right and left corners of the vehicle.

SUMMARY

A suspension system combines the advantages of a semi-active damper system and an active anti-roll system. The two front hydraulic actuators and the two rear hydraulic actuators are each mechanically interconnected using fluid lines. The front and rear hydraulic actuators are not mechanically interconnected. Instead of using fluid lines between the front and rear hydraulic actuators, an electronic connection through the electronic controller links the front and rear suspensions.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
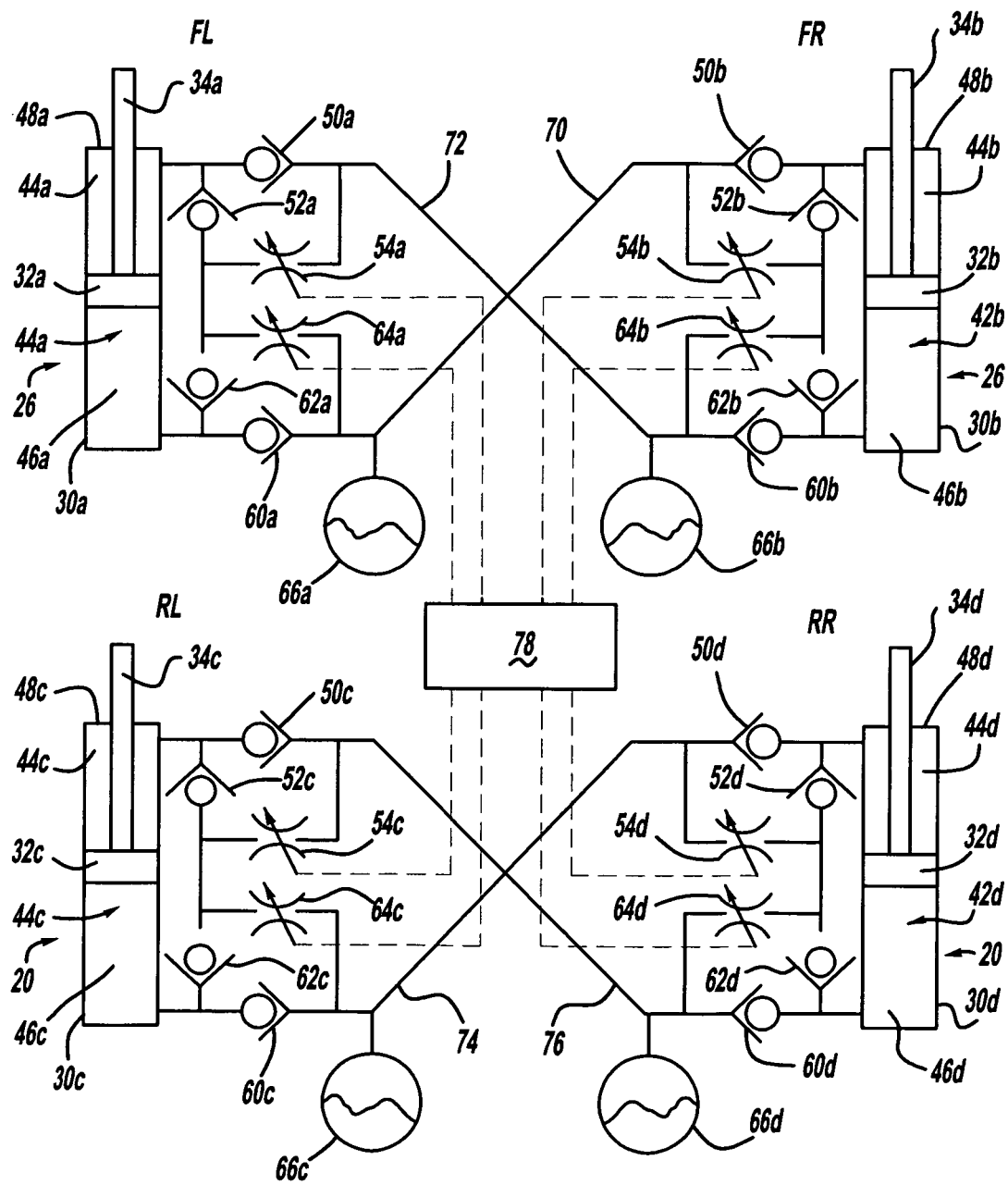

FIG. 1 is diagrammatic illustration of a vehicle incorporating the suspension system in accordance with the present invention; and FIG. 2 is a diagrammatic illustration of the suspension system illustrated in FIG. 1.

DETAILED DESCRIPTION

The following description is merely exemplary in nature and is not intended to limit the present disclosure, application, or uses. There is shown in FIG. 1, a vehicle incorporating a suspension system in accordance with the present invention and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of actuators 20 and by a pair of springs 22. Similarly, front suspension 14 includes a transversely extending front axle assembly (not shown) to operatively support a pair of front wheels 24. The front axle assembly is attached to body 16 by means of a pair of actuators 26 and by a pair of springs 28. Actuators 20 and 26 serve to dampen the relative motion of the unsprung portion (i.e., front and rear suspensions 12, 14) with respect to the sprung portion (i.e., body 16) of vehicle 10. Sensors (not shown), at each wheel 18 and each wheel 24, sense the position and/or the velocity and/or the acceleration of body 16 in relation to rear suspension 12 and front suspension 14. While vehicle 10 has been depicted as a passenger car having front and rear axle assemblies, actuators 20 and 26 may be used with other types of vehicles or in other types of applications including, but not limited to, vehicles incorporating non-independent front, and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Referring to FIG. 2, rear and front suspensions 12 and 14 are diagrammatically illustrated. Each actuator 20 and 26 comprises a pressure tube 30a-30d, a piston 32a-32d and a piston rod 34a-34d.

Each pressure tube 30a-30d defines a working chamber 42a-42d. Each piston 32a-32d is slidably disposed within a respective pressure tube 30a-30d and divides the respective working chamber 42a-42d into an upper working chamber 44a-44d and a lower working chamber 46a-46d. Piston 32a-32d undergoes sliding movement with respect to pressure tube 30a-30d without generating undue frictional forces and piston 32a-32d seals upper working chamber 44a-44d from lower working-chamber 46a-46d. Each piston rod 34a-34d is attached to a respective piston 32a-32d and extends through upper working chamber 44a-44d and through an upper end cap or rod guide 48a-48d which closes the upper end of pressure tube 30a-30d. A sealing system seals the interface between rod guide 42a-48d, pressure tube 30a-30d and piston rod 34a-34d. The end of piston rod 34a-34d opposite to piston 32a-32d is adapted to be secured to the sprung portion of vehicle 10. The end of pressure tube 30a-30d opposite to rod guide 48a-48d is adapted to be connected to the unsprung portion of vehicle 10.

In communication with upper working chamber 44a-44d is a first check valve 50a-50d, a second check valve 52a-52d and an electronically controlled variable valve 54a-54d. First check valve 50a-50d prohibits fluid flow from upper working chamber 44a-44d but allows fluid flow into upper working chamber 44a-44d. Second check valve 52a-52d allows fluid flow from upper working chamber 44a-44d but prohibits fluid flow into upper working chamber 44a-44d. Electronically controlled variably valve 54a-54d controls fluid flow as described below.

In communication with lower working chamber 46a-46d is a first check valve 60a-60d, a second check valve 62a-62d and an electronically controlled variable valve 64a-64d. First check valve 60a-60d prohibits fluid flow from lower working chamber 46a-46d but allows fluid flow into lower working chamber 46a-46d. Second check valve 62a-62d allows fluid flow from lower working chamber 46a-46d but prohibits fluid flow into lower working chamber 46a-46d. Electronically controlled-variable valve 64a-64d controls fluid flow as described below. An accumulator 66a-66d is in communication with working chamber 42a-42d as detailed below.

A first interconnecting fluid line 70 and a second interconnecting fluid line 72 allow working chambers 42a and 42b of actuators 26 to communicate with each other as described below. A third interconnecting fluid line 74 and a fourth interconnecting line 76 allow working chambers 42c and 42d of rear actuators 20 to communicate with each other as described below. An electronic control unit 78 is in communication with electronically controlled variable valves 54a-54d, in communication with electronically controlled variable valves 64a-64d and in communication with the sensors at each wheel 18 and each wheel 24 which senses the position and/or the velocity and/or the acceleration of body 16 with respect to rear suspension 12 and front suspension 14.

The construction of rear suspension 12 and front suspension 14 is basically the same. There is no mechanical connection between front and rear suspensions 12 and 14, there is only an electrical connection through electronic control unit 78. As detailed above, the suspension system comprises four actuators (two rear actuators 20 and two front actuators 26); four accumulators 66a-66d; eight electronically controlled variable valves 54a-54d and 64a-64d; sixteen check valves 50a-50d, 52a-52d, 60a-60d and 62a-62d; and four interconnecting lines 72-78. The working principle of the suspension system will now be described in four operating modes; bounce input, single wheel input, roll input and articulation input.

Bounce

In a pure bounce mode, all four wheels are going to move synchronously. The fluid flows for each corner of vehicle 10 will be the same. The working principle for front left actuators 26 will be described. It is to be understood that the fluid flow in right front actuator 26 and left and right rear actuators 20 will be the same as that described below for left front actuator 26.

When left front actuator 26 is compressed, fluid is pushed out of lower working chamber 46a and through check valve 62a. The rod volume portion of the fluid flow is pushed through electronically controlled variable valve 64a into accumulator 66a. The other part of the fluid flow is pushed through electronically controlled variable valve 54a, through check valve 50a and into upper working chamber 44a. The damping forces are controlled by controlling electronic controlled variable valves 54aand 64ausing electronic control unit 78.

When left front actuator 26 is extended or rebounds, fluid is pushed out of upper working chamber 44a, through check valve 52a, through electronically controlled variable valve 64a, through check valve 60a and into lower working chamber 46a. A rod volume of fluid flow flows out of accumulator 66a through check valve 60a into lower working chamber 46a. The damping forces are controlled by controlling electronically controlled variable valve 64ausing electronic control unit 78.

As discussed-above, the three remaining actuators 26, 20 and 20 have the same working principle and fluid flows in bounce as described above.

Single Wheel

In the case of a single wheel input, there are two options. These two options will be described in relation to a single wheel input to left front actuator 26. It is to be understood that the two options and the fluid flow described below for front left actuator 26 are the same for front right actuator 26 and for left and right actuators 20.

The first option is to have full single wheel stiffness. In this option, electronically controlled variable valves 54b and 64b should be closed by electronic control unit 78 so that it isn't possible for fluid flow to occur in right front actuator 26. The fluid flow for left front actuator 26 occurs as follows. When left front actuator 26 is compressed, fluid is pushed out of lower working chamber 46a and through check valve 62a. The rod volume portion of the fluid flow is pushed through electronically controlled variable valve 64a into accumulator 66a. The other part of the fluid flow is pushed through electronically controlled variable valve 54a, through check valve 50a and into upper working chamber 44a. The damping forces are controlled by controlling electronic controlled variable valves 54a and 64a using electronic control unit 78.

When left front actuator 26 is extended or rebounds, fluid is pushed out of upper working chamber 44a, through check valve 52a, through electronically controlled variable valve 64a, through check valve 60a and into lower working chamber 46a. A rod volume of fluid flow flows out of accumulator 66athrough check valve 60a into lower working chamber 46a. The damping forces are controlled by controlling electronically controlled variable valve 64a using electronic control unit 78.

As discussed above, the three remaining actuators 26, 20 and 20 have the same working principle and fluid flows as described above.

The second option is to have reduced single wheel stiffness which can provide increased comfort. In this option, electronically controlled variable valves 54b and 64b should be opened by electronic control unit 78. When actuator 26 is compressed, fluid is pushed out of lower working chamber 46a and through check valve 62a. Part of the rod volume fluid flow is pushed through electronically controlled variable valve 64a and into accumulator 66a. The other part of the rod volume portion of the fluid flow is pushed through electronically controlled variable valve 64a through interconnecting line 70, through check valve 50b and into upper working chamber 44b of right front actuator 26. This fluid flow pushes piston 32b downward where fluid flow is pushed from lower working chamber 46b of right front actuator 26 through check valve 62b, through electronically controlled variable valve 64b into accumulator 66b. The other part of the fluid flow is pushed through electronically controlled variable valve 54a, through check valve 50a and into upper working chamber 44a. The damping forces are controlled by controlling electronically controlled variable valves 54a and 64a using electronic control unit 78.

When left front actuator 26 is extended or rebounds, fluid is pushed out of upper working chamber 44a, through check valve 52a, through electronically controlled variable valve 64a, through check valve 60a and into lower working chamber 46a. A part of the rod volume of fluid flows out of accumulator 66a through check valve 60a into lower working chamber 46a. The other part of the rod volume flows from upper working chamber 44b of right front actuator 26 through check valve 52b, through electronically controlled variable valve 54b, through interconnecting line 70, through check valve 60a into lower working chamber 46a. This fluid flow causes piston 32b to move upward where fluid flow is replaced in lower working chamber 46b from accumulator 66b through check valve 60b. The damping forces are controlled by controlling electronically controlled variable valve 64a using electronic control unit 78.

This second option provides less total single wheel stiffness. As discussed above, the three remaining actuators 26, 20 and 20 have the same working principle and fluid flow as described above.

Roll

In the roll mode, it is desired to have as high as possible stiffness for the suspension system. A typical roll motion is when the front and rear left wheel go into compression and the front and rear right wheel go into extension or rebound. The opposite roll motion is when the front and rear left wheel go into extension or rebound and the front and rear right wheel go into compression. When vehicle 10 is in a roll mode, the axis between the front wheels and the axis between the rear wheel roll in the same direction. The fluid flow will be described using the front wheels of vehicle 10. It is to be understood that the rear wheels of vehicle 10 react in the same manner and have the same fluid flow. Also, the following description is for a left-hand roll where the left wheel goes into compression and the right wheel goes into rebound or extension. It is to be understood that the fluid flow for an opposite right hand roll is the same but opposite in direction.

During a left hand roll, electronically controlled variable valves 54a and 64b are closed. The fluid from lower working chamber 46a of front left actuator 26 is pushed through check valve 62a, through electronically controlled variable valve 64a and into accumulator 66a. The fluid from upper working chamber 44b of right front actuator 26 is pushed through check valve 52b, through electronically controlled variable valve 54b, through interconnecting line 70 and into accumulator 66a. The fluid that is flowing into upper working chamber 44a of left front actuator 26 is flowing out of accumulator 66b, through interconnecting line 72, through check valve 50a and into upper working chamber 44a. The fluid flow flowing into lower working chamber 46b of right hand actuator 26 is flowing out of accumulator 66b, through check valve 60b and into lower working chamber 46b. The roll damping is controlled by controlling the fluid flow through electronically controlled variable valves 64a and 54b by electronic control unit 78.

As discussed above, the fluid flow between left rear and right rear actuators 20 is the same as that described above for left front and right front actuators 26. Also, for a roll in the opposite direction, the fluid flow between left front and right front actuators 26 and the fluid flow between left rear and right rear actuators 20 are in the opposite direction to that described above.

Articulation

In the case of articulation, the axis between the two front wheels and the axis between the two rear wheels are rolled in opposite directions. In this situation, it is desirable to have as less as possible stiffness. For exemplary description, the following discussion is based upon the left front actuator 26 going into compression, the right front actuator 26 going into rebound, the left rear actuator 20 going into rebound and the right rear actuator 20 going into compression. It is to be understood that the fluid flow is the same but opposite in direction when articulation occurs in the opposite direction.

During the described articulation movement, for the left and right front corners, electronically controlled variable valves 64a and 54b are closed. The fluid is pushed from lower working chamber 46a of left front actuator 26, through check valve 62a and through electronically controlled variable valve 54a. Part of the fluid flows through check valve 50a and into upper working chamber 44a of left front actuator 26. The rod volume flow of fluid flows through interconnecting line 72, through check valve 60b and into lower working chamber 46b of right front actuator 26. The fluid pushed out of upper working chamber 44b of right front actuator 26 is pushed through check valve 52b, through electronically controlled variable valve 64b, through check valve 60b, and into lower working chamber 46b of right front actuator 26. There is no flow to or from accumulators 66a and 66b and thus no additional stiffness built up. The damping characteristics are controlled by controlling the fluid flow through electronically controlled variable valves 54a and 64b by electronic control unit 78.

During the described articulation movement, for the left and right rear corners, electronically controlled variable valves 54c and 64d are closed. The fluid is pushed from lower working chamber, 46d of right front actuator 20, through check valve 62d and through electronically controlled variable valve 54d. Part of the fluid flows through check valve 50d into upper working chamber 44d of right rear actuator 20. The rod volume flow of fluid flows through interconnecting line 74, through check valve 60c and into lower working chamber 46c of left rear actuator 20. The fluid pushed out of upper working chamber 44c of left rear actuator 20 is pushed through check valve 52c, through electronically controlled variable valve 64c, through check valve 60c and into lower working chamber 46c of left rear actuator 20. There is no flow to or from accumulators 66a and 66b and thus no additional stiffness built up. The damping characteristics are controlled by controlling the fluid flow through electronically controlled variable valves 54d and 64c by electronic control unit 78.

Pitch

A typical pitch motion is when the front left and right wheels go into compression and the rear left and right wheels go into extension or rebound. The opposite pitch motion is when the front left and right wheels go into extension or rebound and the rear left and right wheels go into compression.

During pitch motion, front left and right actuators are controlled the same as that described above for the bounce mode except that instead of all four wheels moving in the same direction, the front wheels move in a direction opposite to the rear wheels. The fluid flow will be the same as that described above for the bounce mode except that the front actuators 26 will move in compression when the rear actuators 20 move in extension or rebound and the front actuators 26 will move in extension or rebound when the rear actuators 20 move in compression.

The above described suspension system offers the ability to control electronically by electronic control unit 78 all of the damping characteristics similar to a semi-active damper system but, the above described suspension system can also control single wheel input, vehicle roll movement, articulation movement and pitch movement. The above described suspension system eliminates mechanical decoupling of the roll, articulation and pitch modes and uses only an electronically decoupling using electronic control unit 78.

What is claimed is:

1. A suspension system comprising:
   a first shock absorber;
   a second shock absorber;
   a first communication line extending between said first and second shock absorber;
   a second communication line extending between said first and second shock absorber;
   a first variable valve controlling fluid flow from an upper working chamber of said first shock absorber to a first accumulator through a first check valve associated with said first shock absorber, said first variable valve and said first communication line;
   a second variable valve controlling fluid flow from a lower working chamber of said second shock absorber to said first accumulator through a first check valve associated with said second shock absorber and said second variable valve;
   a second accumulator from which fluid flows to an upper working chamber of said second shock absorber through said second communication line and a second check valve associated with said second shock absorber and from which fluid flows to a lower working chamber of said first shock absorber through a second check valve associated with said first shock absorber; and
   a control unit in communication with said first and second shock absorbers and in communication with said first and second variable valves.

2. The suspension system according to claim 1, further comprising:
   a third variable valve controlling fluid flow from the upper working chamber to the lower working chamber of said second shock absorber, said third variable valve controlling damping forces for said second shock absorber; and
   a fourth variable valve controlling fluid flow from the lower working chamber to the upper working chamber of said first shock absorber, said fourth variable valve controlling damping forces for said first shock absorber; wherein
   said control unit is in communication with the third and fourth variable valves.

3. The suspension system according to claim 2, wherein:
   said first communication line extends between said first and second variable valves; and
   said second communication line extends between said fourth and third variable valves.

4. The suspension system according to claim 1, further comprising:
   a third shock absorber;
   a fourth shock absorber;
   a third communication line extending between said third and fourth shock absorber;
   a fourth communication line extending between said third and fourth shock absorber; wherein
   said control unit is in communication with said third and fourth shock absorbers.

5. The suspension system according to claim 4, further comprising:
   a third variable valve controlling fluid flow between an upper working chamber and a lower working chamber of said second shock absorber, said third variable valve controlling damping forces for said second shock absorber; and
   a fourth variable valve controlling fluid flow between the upper working chamber and the lower working chamber of said second shock absorber, said fourth variable valve controlling damping forces for said second shock absorber; wherein
   said control unit is in communication with the third and fourth variable valves.

6. The suspension system according to claim 5, further comprising:
   a fifth variable valve controlling fluid flow between an upper working chamber and a lower working chamber of said third shock absorber, said fifth variable valve controlling damping forces for said third shock absorber;
   a sixth variable valve controlling fluid flow between the upper working chamber and the lower working chamber of said third shock absorber, said sixth variable valve defining damping forces for said third shock absorber;
   a seventh variable valve controlling fluid flow between an upper working chamber and a lower working chamber of said fourth shock absorber, said seventh variable valve defining damping forces for said fourth shock absorber; and
   an eighth variable valve controlling fluid flow between the upper working chamber and the lower working chamber of said fourth shock absorber, said eighth variable valve controlling damping forces for said fourth shock absorber; wherein
   said control unit is in communication with the fifth, sixth, seventh and eighth variable valves.

7. The suspension system according to claim 6, wherein:
   said first communication line extends between said first and second variable valves; and
   said second communication line extends between said fourth and third variable valves.

8. The suspension system according to claim 7, wherein:
   said third communication line extends between said fifth and eighth variable valves; and said fourth communication line extends between said sixth and seventh variable valves.

9. The suspension system according to claim 8, further comprising:
a third accumulator in communication with said third communication line; and
a fourth accumulator in communication with said fourth communication line.

10. The suspension system according to claim 4, further comprising:
a third accumulator in communication with said third communication line; and
a fourth accumulator in communication with said fourth communication line.

* * * * *